United States Patent [19]
Yuval

[11] Patent Number: 5,956,405
[45] Date of Patent: Sep. 21, 1999

[54] IMPLEMENTATION EFFICIENT ENCRYPTION AND MESSAGE AUTHENTICATION

[75] Inventor: Gideon A. Yuval, Mercer Island, Wash.

[73] Assignee: Microsoft Corporation, Redmond, Wash.

[21] Appl. No.: 08/784,841

[22] Filed: Jan. 17, 1997

[51] Int. Cl.⁶ ............................................. H04K 1/00
[52] U.S. Cl. ......................................................... 380/29
[58] Field of Search ............................................. 380/29

[56] References Cited

U.S. PATENT DOCUMENTS

| | | | |
|---|---|---|---|
| 3,962,539 | 6/1976 | Ehrsam et al. | 380/29 |
| 4,074,066 | 2/1978 | Ehrsam et al. | 380/29 |
| 4,172,213 | 10/1979 | Barnes et al. | 380/29 |
| 4,274,085 | 6/1981 | Marino, Jr. | 380/29 |

*Primary Examiner*—Salvatore Cangialosi
*Attorney, Agent, or Firm*—Michaelson & Wallace; Peter L. Michaelson; Michael P. Straub

[57] ABSTRACT

Encryption and authentication techniques which can be implemented on inexpensive, e.g., 8-bit, microprocessors and micro-controllers, using very little of the microprocessor's memory, are described. While the described techniques require little system resources to implement they still provide a good degree of security. In accordance with the present invention, in order to avoid having to specifically dedicate a portion of the microprocessor's limited memory for use as a substitution box, a portion of the code stored in the microprocessor's memory, dedicated to performing another function, is selected to serve as an S-box. This memory saving technique is used to implement a block cipher. The block cipher is used in combination with a series of other data manipulation operations, including XOR operations and rotate operations, to provide a good degree of system security. The operations used to implement the techniques of the present invention are capable of being implemented using 8 bit instructions making the techniques of the present invention well suited for implementation on 8 bit systems such as those used in home and auto control applications. The message protocol and encryption scheme of the present invention involves the subtracting of current message payloads from previously received message payloads to distinguish between new messages and repeated messages which have already been acted upon. Messages are acted upon only once thereby rendering the recording and playing back of previous messages ineffective at defeating system security.

26 Claims, 14 Drawing Sheets

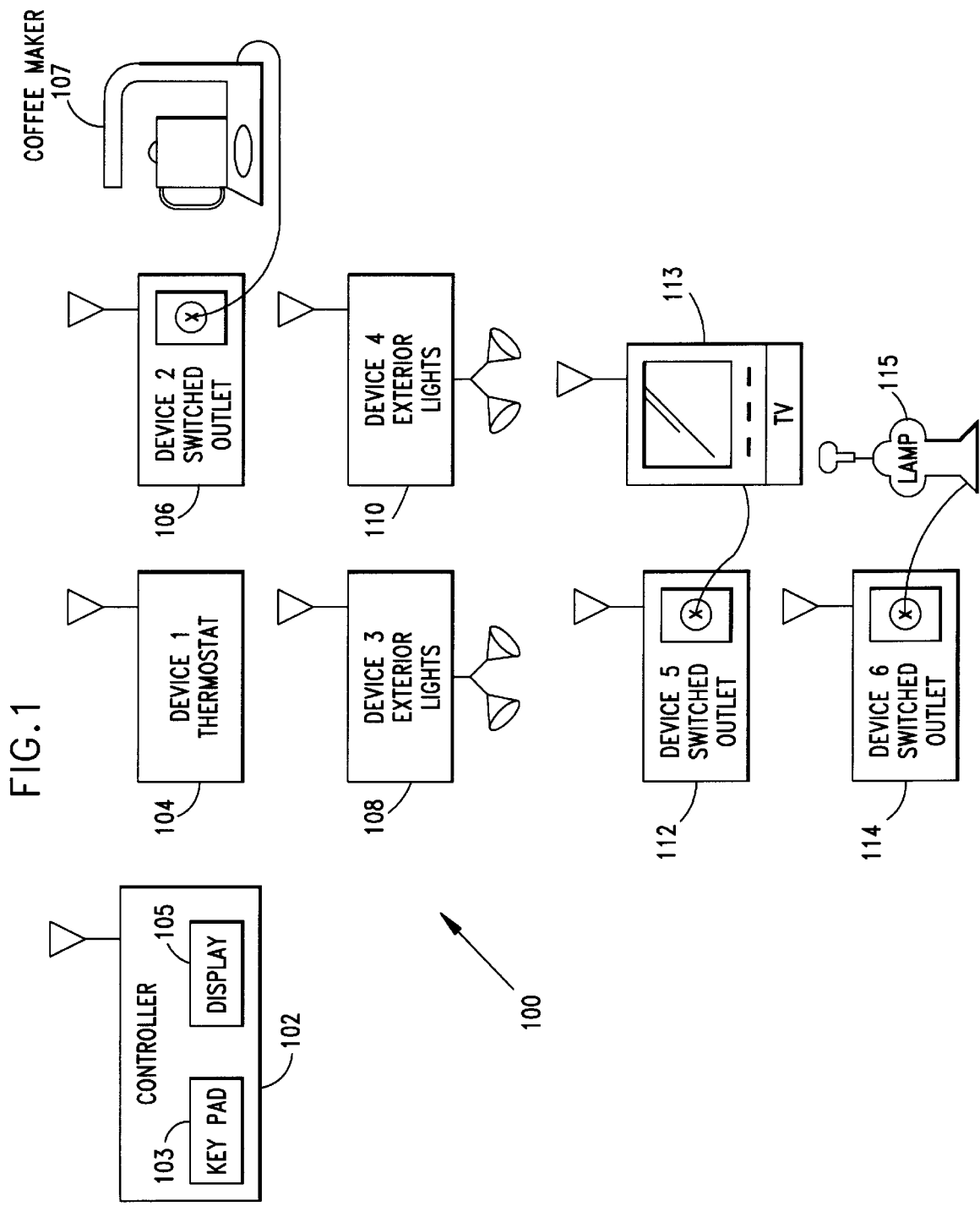

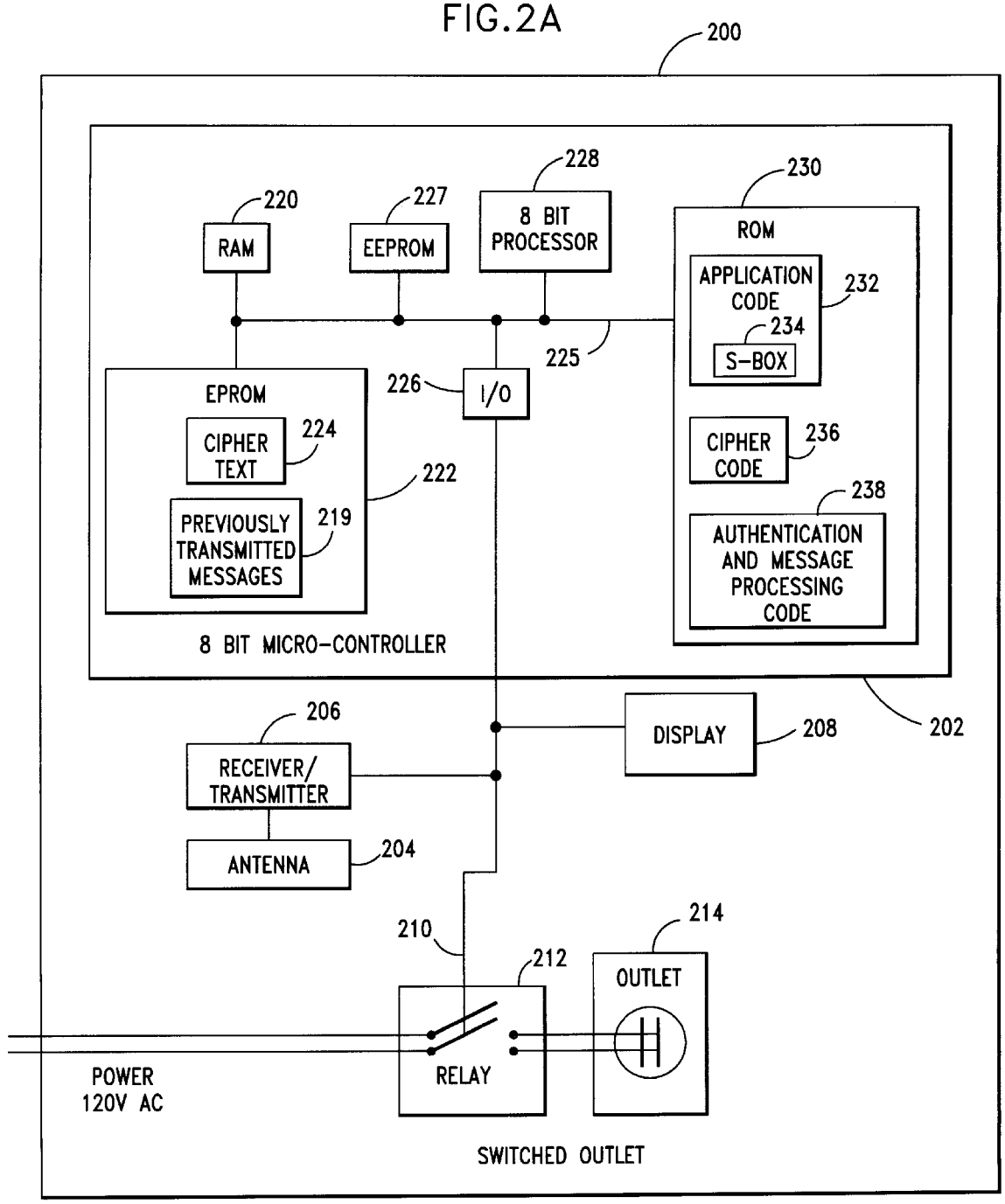

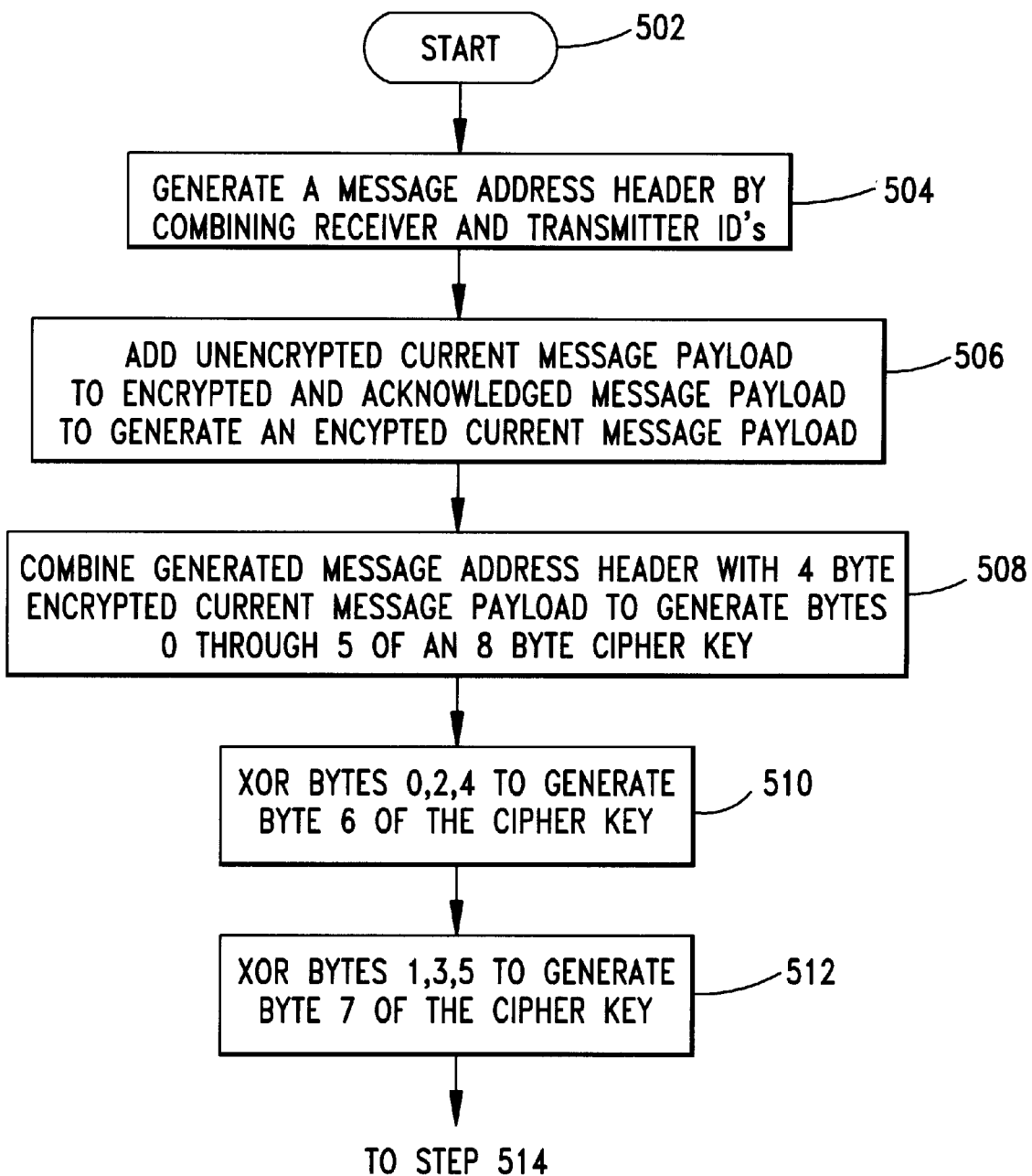

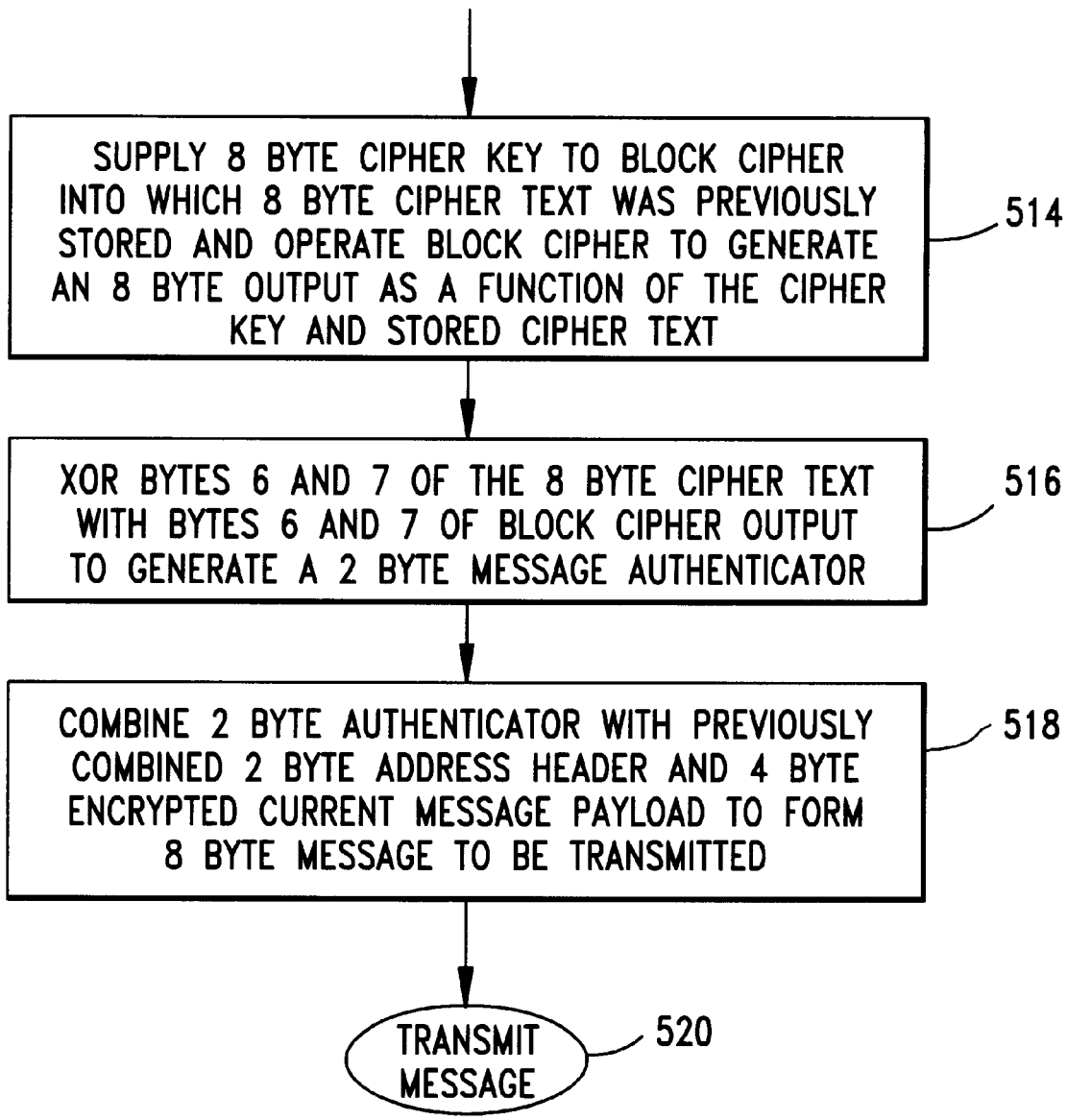

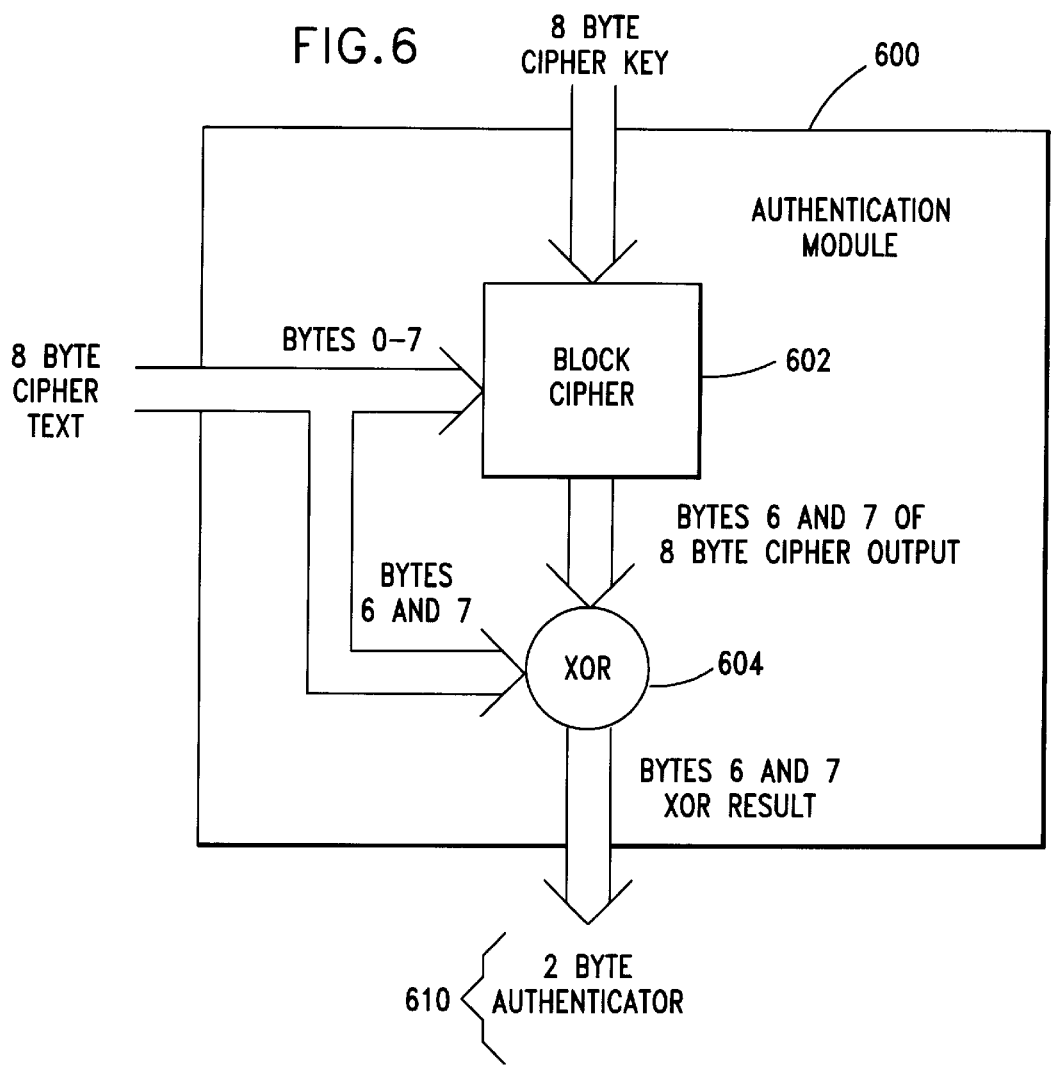
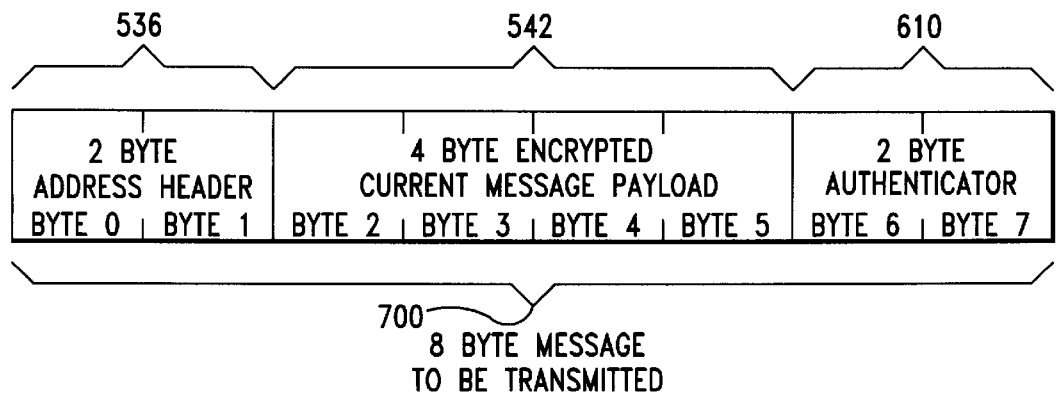

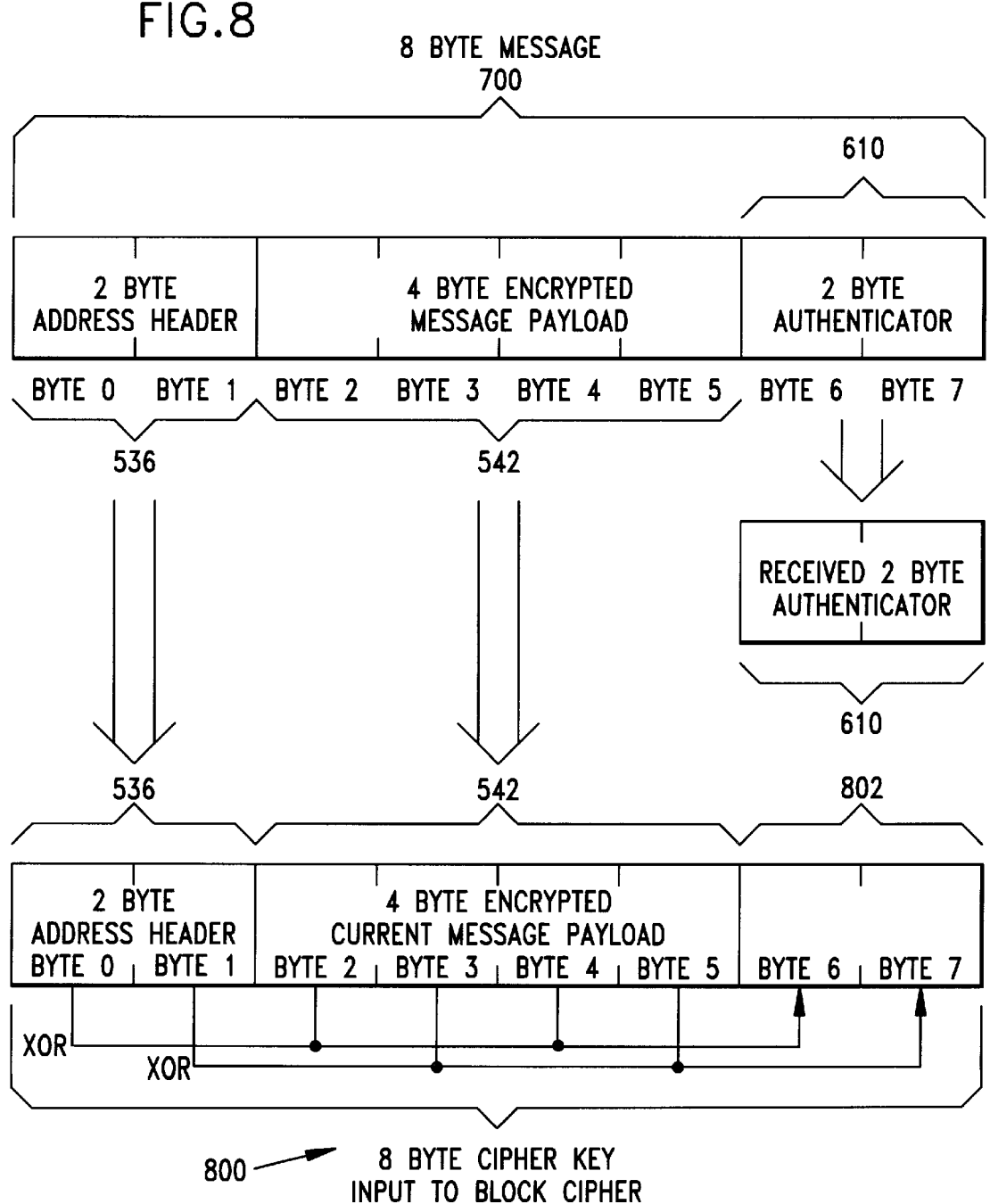

IMPLEMENTATION EFFICIENT ENCRYPTION AND MESSAGE AUTHENTICATION

FIELD OF THE INVENTION

The present invention is directed to encryption and message authentication, and more particularly, to methods and apparatus for efficiently implementing encryption and message authentication using limited hardware resources.

BACKGROUND OF THE INVENTION

The use of inexpensive microprocessors to control home appliances, answering machines, automotive ignition systems, security systems as well as hosts of other items is becoming common place. This is due in large part to the continuing decline in the cost of microprocessors, e.g., 8 bit microprocessors. Frequently, such 8 bit microprocessors cost only a small fraction of the sales price of an appliance.

With the common place use of microprocessor based control devices, a fair amount of emphasis is now being placed on controlling such devices either remotely or through the use of a centralized controller, e.g., in the case of home systems.

To avoid the need to hardwire devices to controllers, the use of existing power lines as a communication medium and/or wireless communication techniques, e.g., the use of radio signals, are often favored for use with home control and other types of systems. Unfortunately, individuals who are not authorized to access such systems often have the same degree of access to the communications medium used, e.g., the radio signals or power lines, that authorized individuals have. This poses a security problem.

Accordingly, there is a need to add encryption and/or authentication capabilities to systems, e.g., home control systems, auto ignition systems, answering machines, etc., where an unauthorized individual has or can gain easy access to the communications medium used to communicate messages to a remotely controlled device. Furthermore, it is desirable that implemented security methods be safe from replay attacks where an unauthorized individual attempts to gain access by replaying a previously transmitted, and all too frequently recorded, message.

The problem of adding security to microprocessor and micro-controller controlled devices, e.g., home appliance devices, is frequently compounded by cost pressures. For cost reasons, relatively inexpensive microprocessors and/or micro-controllers such as, e.g., the eight bit Intel™ 8051, are often used to control home appliance devices. Such microprocessors offer relatively few resources, e.g., 1 KB flash EPROM, 64 bytes of program RAM, 64 bytes of data RAM, 128 bytes of EEPROM and an instruction rate of 1 MHz or less. Of these resources, after the communication and control applications which are necessary to performing the primary control task of the microprocessor are accounted for, there is very little left, particularly in the case of memory, which can be used for the implementation of security schemes.

Various security algorithms which currently exist include the SAFER-SK™ family of algorithms which offer a good degree of security. Unfortunately, the SAFER-SK algorithms require 512 bytes of ROM to implement two substitution boxes in addition to another 1–2 KB bytes of memory to store the algorithms code. Getting that amount of memory from the inexpensive microprocessors which are preferred for use in home appliance applications is impractical given the need to allocate memory to the controller's primary functions as well.

TEA, which stands for Tiny Encryption Algorithm, is another well known security algorithm. While TEA™ is relatively tiny when considered in the context of the memory and processing resources of a 32 bit microprocessor, it is not sufficiently small for implementation on an 8 bit microcontroller which is responsible for performing other tasks as well. Furthermore, TEA involves the use of processing operations that are difficult to implement using 8 bit microprocessors.

Accordingly, the memory and/or processing requirements of existing encryption algorithms make them unsuitable for low cost applications where resources are limited to the memory and processing capability that is incorporated into an 8 bit controller which must also perform other tasks in addition to an encryption/authentication task.

In view of the above discussion, it is clear that there is a need for encryption and/or authentication methods which can be implemented using relatively little in terms of memory and/or processing capability resources. Furthermore, it is desirable that such methods be capable of being implemented using relatively inexpensive, e.g., 8 bit, microprocessors and/or micro-controllers dedicated to performing other functions in addition to the encryption/authentication function. It is also desirable that such methods be safe from replay attacks where an old message or command is played back in an attempt to gain unauthorized access to a device or to have a device perform an unauthorized operation.

SUMMARY OF THE PRESENT INVENTION

The present invention is directed to methods and apparatus for efficiently implementing encryption and message authentication procedures using limited hardware resources, e.g., memory. As will be discussed in detail below, the encryption and authentication techniques of the present invention include many features which allow them to be implemented on inexpensive, e.g., 8-bit, microprocessors and micro-controllers, using very little of the microprocessor's memory.

In accordance with the present invention, in order to avoid having to specifically dedicate a portion of a microprocessor's limited memory for use as a substitution box ("S-box"), a portion of the code stored in the microprocessor's memory, e.g., ROM, dedicated to performing another function, is selected to serve as an S-box. In a system with several devices, the code selected to be used as the S-box is a code segment which is common to the system devices that will communicate messages to each other.

The present invention's memory saving technique of using application code as an S-box is used to implement a block cipher without having to use a large amount of memory dedicated to the block cipher. Various data manipulation operations, e.g., additions and shift operations, which can be easily implemented as a series of 8 bit operations, are incorporated into the block cipher of the present invention for added security. By performing a large number of substitution operations and data manipulation operations as part of the block cipher, over and over again, a high degree of security can be achieved without the use of a dedicated S-Box. The block cipher is used to generate a message authentication code when transmitting a message and, when receiving a message, to verify the authenticity thereof. XOR operations are used as part of the process of generating a message authentication code to increase security.

In order to protect a system implementing the present invention from what are referred to as message replay attacks, the message protocol and encryption scheme of the present invention allows for messages to be transmitted any multiple number of times but acted upon only once by a receiver of the message.

This involves the detection of previously received and acted upon messages in accordance with the present invention by subtracting a portion of a received message from a corresponding portion of a previously received message to determine if the most recently received message is a new message or simply a repeat of an old message which has already been acted upon.

Because of the various block cipher, authentication code, and message protocol features of the methods of the present invention, a high degree of security can be obtained in systems implementing the present invention. Furthermore, because the encryption and authentication methods of the present invention can be achieved using relatively little memory and easy to implement 8 bit operations, the methods of the present invention are particularly well suited for use in cost sensitive applications which use, e.g., 8 bit microprocessors or micro-controllers. Examples of suitable applications include home appliance control systems, answering machines, garage door openers to name but a few applications.

Numerous additional features and advantages of the methods and apparatus of the present invention are discussed below in the detailed description that follows.

BRIEF DESCRIPTION OF THE DRAWINGS

FIG. 1 illustrates a home control system implemented in accordance with one embodiment of the present invention.

FIG. 2A illustrates a switched outlet device implemented in accordance with the present invention suitable for use as one of the switched outlet devices of FIG. 1.

FIGS. 5A and 5B, in combination illustrate the steps associated with creating an encrypted message in accordance with the present invention.

FIG. 6 illustrates an authentication circuit implemented in accordance with the present invention.

FIG. 7 illustrates an 8 byte message generated by performing the steps of FIGS. 5A and 5B and by using the authentication circuit 600 illustrated in FIG. 6.

FIG. 8 illustrates data processing associated with the authentication of a received message.

DETAILED DESCRIPTION

Figure 2B:
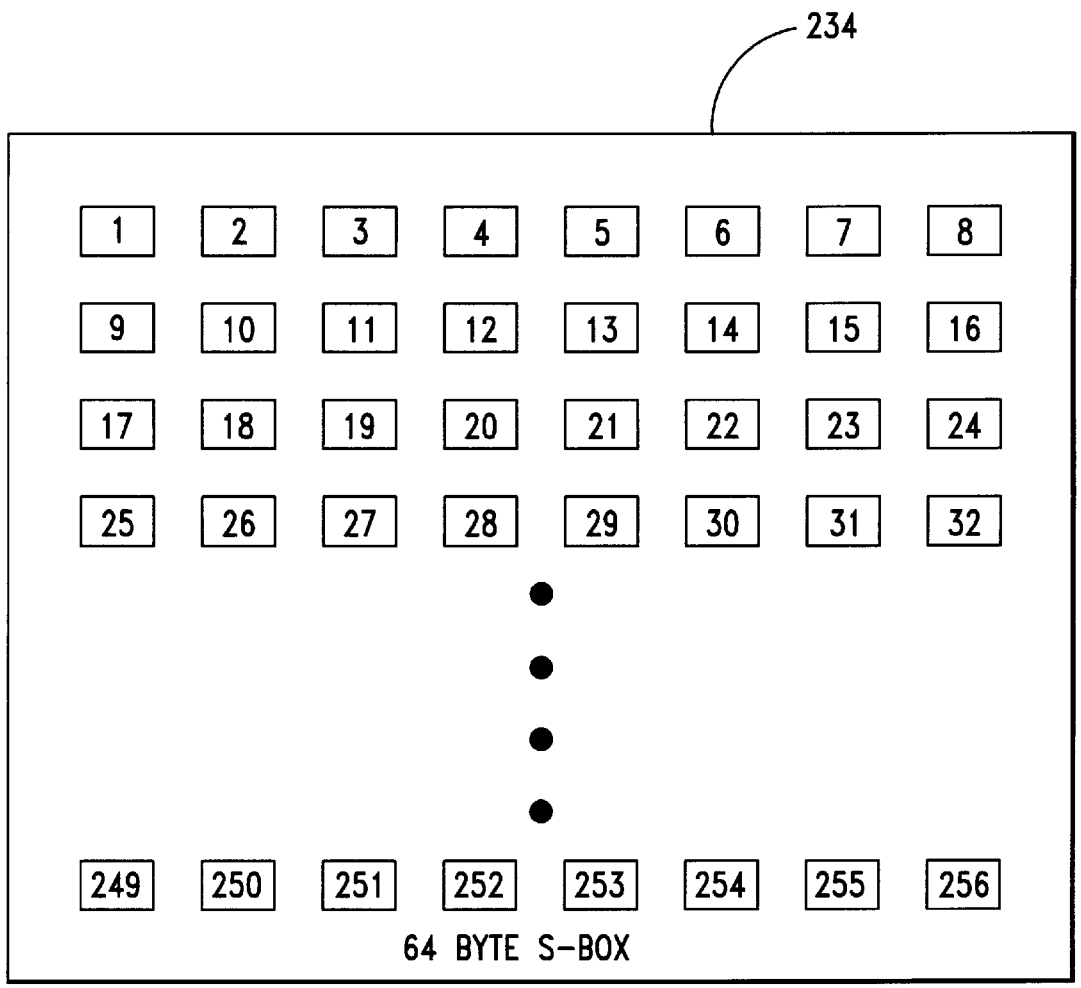
FIG. 2B illustrates a segment of the switched outlet device's memory of FIG. 2A suitable for use as a substitution box.

As discussed above, the present invention is directed to methods and apparatus for efficiently implementing encryption and/or message authentication using limited hardware resources.

The present invention is applicable to a wide variety of security applications. However, the methods of the present invention are particularly well suited to applications where resources are limited do to cost or other factors. For purposes of explanation, the present invention will be described in terms of an exemplary home control system embodiment. A home control system 100, implemented in accordance with the present invention, is illustrated in FIG. 1.

The home control system 100 includes a controller 102 and a plurality of controlled devices. The controller 102 includes a keypad 103 for the input of information, e.g., the programming of the controller 102 to control various devices, and a display 105 for displaying various information, e.g., about the status of the system and the entered control program. The controlled devices include a thermostat 104, a first switched outlet 106, first and second exterior lights 108, 110, in addition to second and third switched outlets 112, 114. The switched outlets 106, 110, 114 may be used to control various appliances such as a coffee maker 107, a television set 113 and a lamp 115. As illustrated, the controller 102 and each of the controlled devices 104, 106, 108, 110, 112, 114 includes an antenna to facilitate the communication of information between the controller and the controlled devices 104, 106, 108, 110, 112, 114.

As an alternative to the use of radio waves for the communication of messages and information, the controller 102 and controlled devices 104, 106, 108, 110, 112, 114 can be coupled together via existing home power lines. In such an alternative embodiment, messages and information to be communicated between the controller 102 and controlled devices is modulated onto the existing 60 MHz signal which supplies power to the outlets to which the controller 102 and controlled devices are/coupled.

Referring now to FIG. 2, there is illustrated a representative controlled device 200. The controlled device 200 serves as a switched outlet and may be used as any one of the first, second or third switched outlets 106, 112, 114 of the home control system 100. The controller 102 and other devices 104, 108, 110, are similar in design to the switched outlet 200. However, the controller 102 includes a keypad to facilitate programming. While the controller does not directly control an individual appliance or outlet, it is responsible for remotely controlling the various controlled devices. Unlike the switched outlet device 200, devices 104, 108 and 110 include hardware and programming to control non-outlet types of devices, e.g., a thermostat or exterior lights.

The switched outlet 200 includes an antenna 204 for receiving and transmitting messages, receiver transmitter/circuitry 206, a controlled relay 212, an outlet 214, a display 208 and a micro-controller 202 which are coupled together as illustrated in FIG. 2A. The antenna 204 is used for receiving and transmitting messages, e.g., radio frequency messages. The receiver/transmitter circuitry 206 couples the antenna to the micro-controller 202 and is responsible for amplifying both received and transmitted signals in addition to performing any required signal modulation operations. The receiver/transmitter circuitry 206 is designed in the exemplary embodiment to consume relatively little power and to operate at relatively low data rates, e.g., 10 kbits/s.

The display device 208, relay 212 and outlet 214 are also coupled to the micro-controller 202. The display 208 may be implemented as one or more light emitting diodes which are used to indicate the status of the switched outlet, e.g., if the outlet is in the on or off state, and whether data is being received or transmitted. The relay 212 is controlled by the micro-controller 202 to either supply power to the outlet 214 or to disconnect the power being supplied thereto.

The micro-controller 202 includes a random access memory 220, an 8 bit microprocessor (CPU) 228, an electronically programmable read only memory EPROM 222, an electronically erasable programmable read only memory EEPROM 227, a read only memory ROM 230 and an input/output device 226 which are coupled together in a conventional manner by bus 225. In various embodiments, the EPROM 222 and/or EEPROM 227 may be omitted from the micro-controller. The micro-controller 202 may be implemented using, e.g., an 8 bit microprocessor such as the Intel 8051. In one implementation the Intel 8051 includes 4 KB of ROM and 128 bytes of RAM (64 bytes data RAM and 64 bytes instruction RAM). The I/O device 226 is used for electrically coupling and interfacing the micro-controller 202 with external components, e.g., the receiver transmitter 206, display 208, and relay 212, which are coupled to the micro-controller 202.

The various memory devices 220, 222, 227, 230 are used for storing application related program code as well as initialization and operating system program code and data. In the embodiment illustrated in FIG. 2A, the ROM 230 is illustrated as including application code 232, cipher code 236 used to implement a cipher algorithm in accordance with the present invention, and authentication and message processing code 238 used to perform various message generation, encryption, and processing operations. The application code 232 includes code for controlling the operation of the relay 212, for controlling the communication of information over the bus 225, and for implementing various other non-encryption and non-authentication related operations including system initialization. As will be discussed in greater detail below, a segment of the application code 232, e.g., a 256 byte segment, is selected and used in accordance with the present invention, as the S-Box 234. Thus, the present invention provides for the dual use of a portion of the application code, i.e., it serves it purpose as part of the application code but it also serves as an S-box. In this manner, by re-using a selected portion of the application code as an S-box, the need to store a dedicated S-box in memory and to provide memory for the storage of a dedicated S-box is eliminated.

Referring now to FIG. 2B, there is illustrated a 256 byte block of application code which has been selected for use as the S-box 234. The S-box 234 comprises a series of 256 sequential bytes of data labeled using reference numbers 1 to 256, for a total of 2048 bits in all (256*8=2048 bits). Any one of the 256 bytes in the S-box 234 can be accessed using an 8 bit address which uniquely defines the position of the byte in the S-box. As will be discussed below, 1 byte S-box addresses are used to access bytes of data stored in the S-box as part of the cipher mechanism of the present invention.

Figure 3:
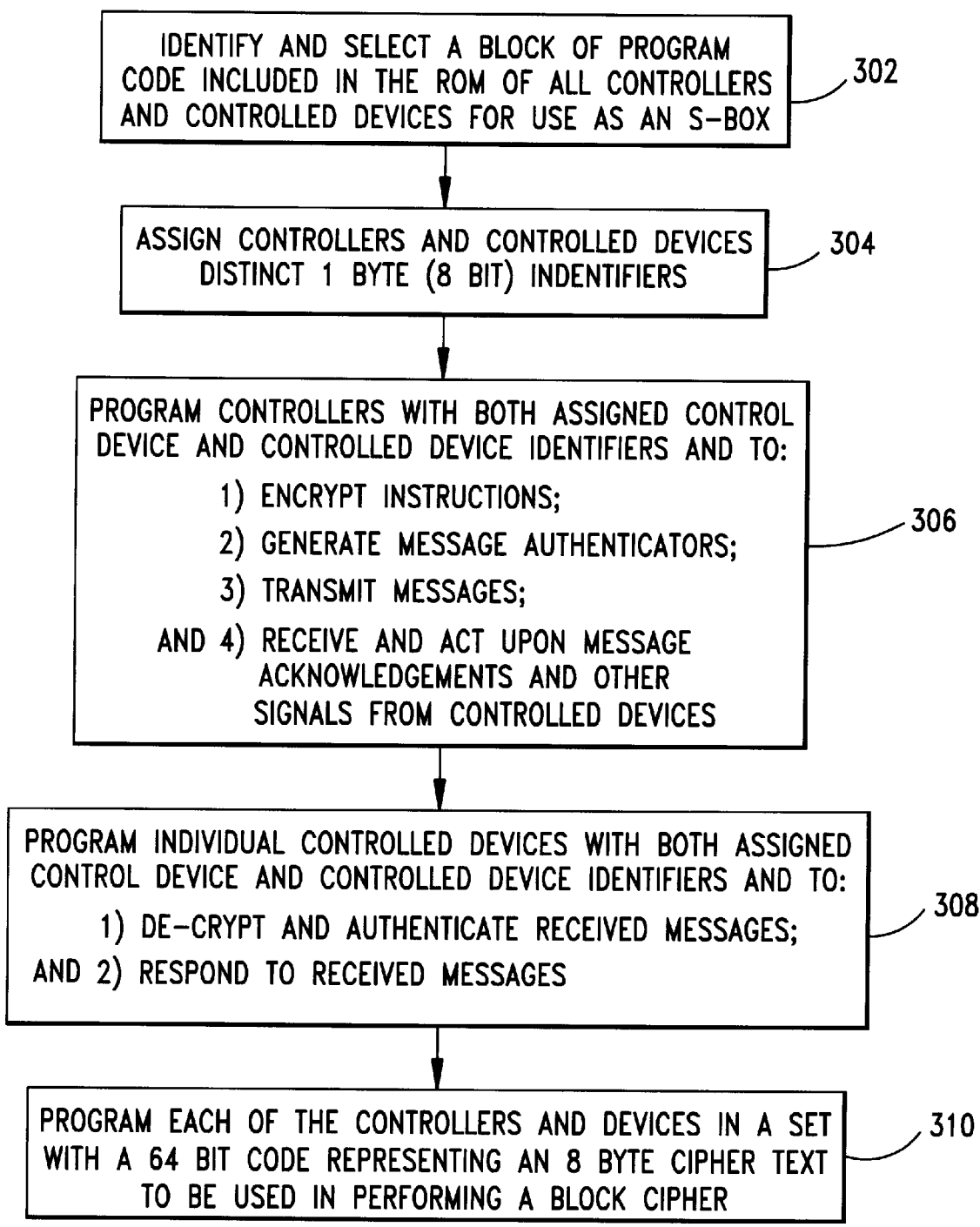
FIG. 3 illustrates various steps associated with implementing the home control system of the present invention.

FIG. 3 illustrates various steps associated with incorporating message encryption and authentication methods of the present invention into a home control system. As discussed above, the present invention avoids the need to provide a dedicated S-box by utilizing application code which is stored in the ROM 230 as an S-box. Accordingly, the first step 302 in implementing the encryption/authentication method of the present invention is to identify and select a block of application code 234 that is included in the ROM of the controller 102 as well as the controlled devices 104, 106, 108, 110, 112, 114. The goal of this operation is to select a block of code, e.g., a non-zero 256 byte block of code, which is suitable for use as an S-box. Because the controller 102 and controlled devices will normally be implemented using the same micro-controller 202 or will be made by the same manufacturer, it is likely that the controller 102 and controlled devices will share at least some common application code, e.g., for controlling initialization, bus protocols, the I/O interface, etc. It is this common code that can be selected as the S-box.

For security reasons, it is desirable that the S-box include a certain amount of randomness. Such randomness is likely to be inherent in application code which tends to be written or compressed to avoid redundancy and thereby increase storage efficiency.

If desired, blocks of application code common to the controller 102 and controlled devices can be tested for there usefulness as an S-box by compressing them. If a block of code does not compress well, e.g., it compresses only slightly or not at all, it indicates that there is little redundancy in the code and that it would probably be a good choice for use as the as the S-box 234.

Having selected a common block of application code for use as an S-box, the next step 304, in implementing the encryption/authentication method of the present invention, involves assigning the controller 102 and controlled devices 104, 106, 108, 110, 112, 114 unique identifies, e.g., 1 byte identifiers, to be used when communicating messages between the controlled devices and controller 102.

Once the S-box selection and assignment of identifiers has been made, the memory, e.g., ROM 230, of the program controller 102 is programmed with both the assigned controller identifier and the assigned device identifiers. This is done in step 306. The controller 102 is also programmed in step 306 with program code that controls: 1) the encryption of message payloads; 2) the generation of message authenticators; 3) the transmission of messages, e.g., to controlled devices; and 4) the receipt and response made to messages, acknowledgments, and other signals received from another controller 102 or a controlled device.

In step 308, the individual controlled devices are programmed with both the assigned controller identifier and the assigned device identifiers. In embodiments where controlled devices do not communicate with each other but only with the controller 102, each individual controlled device need only be programmed with its unique assigned identifier and the identifier of the controller 102 with which it is to communicate. The controlled devices 104, 106, 108, 110, 112, 114 102 are also programmed in step 308 with program code that controls: 1) the de-cryption and authentication of received messages; and 2) the actions which are to be taken in response to received messages including the sending of acknowledgments and the control of devices attached to the micro-controller 202 in response to received instructions.

The programming performed in step 306 and 308 is normally done at the time the ROM 230 is manufactured. After the manufacture of the controller 102 and the controlled devices 104, 106, 108, 110, 112, 114, step 310 is performed. Step 310 can be performed by, e.g., a homeowner at the time the home control system 100 is installed.

Step 310 involves the programming of each of the controllers 102 and controlled devices in a set of such devices, used for an individual home, with a user selected 64 bit code referred to as an 8 byte cipher text code. The 64 bit cipher text code can be stored in the EPROM 222 or EEPROM 227 of the microprocessor 202 included in each of the controllers or controlled devices being programmed. After programming, the 64 bit cipher text will be common to all the controller and controlled devices of the individual system 100. The 64 bit cipher code is used, in accordance with the present invention, when performing a block cipher operation and may be thought of as a commonly shared "secret" used by the devices in a particular home control system as part of the message authentication process. The cipher text may be programmed into a system's devices by, e.g., physically connecting a programming unit to the antenna input of the device being programmed or by connecting the programming unit to the power supply terminals of the device or controller being programmed. By directly coupling the device being programmed to a programming module, the risk of the 64 bit code being intercepted by an unauthorized user is reduced as compared to when radio signals are used to remotely program the controller's and/or controlled devices. However, the present invention does not preclude the programming of the 64 bit code using such signals.

Having discussed the hardware included in each controller 102 and controlled devices 104, 106, 108, 110, 112, 114 as well as the programming of such devices, our discussion will now turn to a detailed explanation of a method of generating encrypted messages in accordance with the present invention.

Figure 4:
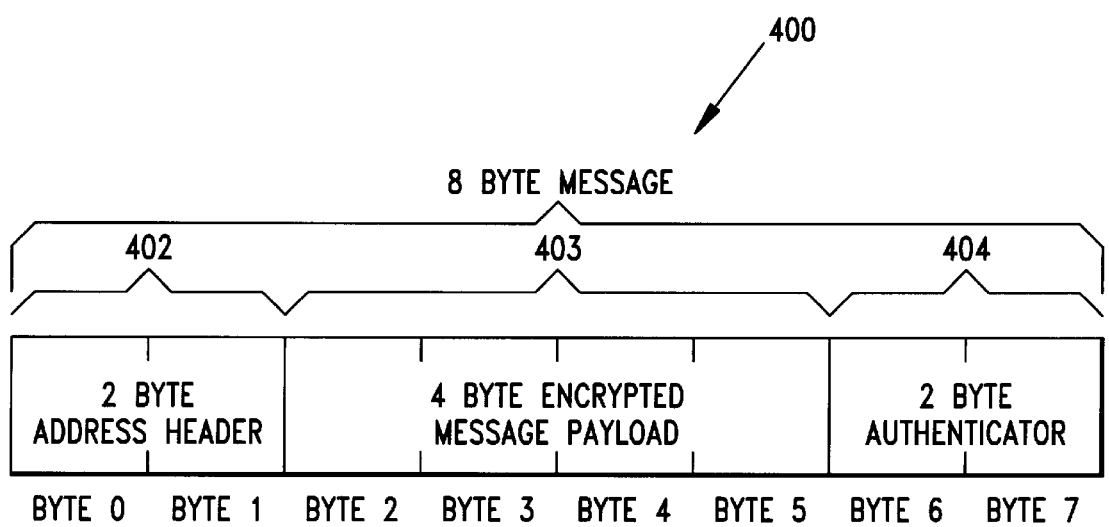
FIG. 4 illustrates an 8 byte message format suitable for communicating commands and information between the controller and controlled devices of the home control system illustrated in FIG. 1.

FIG. 4 illustrates an 8 byte message format suitable for communicating commands and information between the controller 102 and controlled devices of the home control system 100. As illustrated the message 400 includes three components, a 2 byte address header 402, a 4 byte encrypted message payload 403, and a 2 byte authenticator 404. The 2 byte address header 402 includes what may be thought of as "to" and "from" fields. In one embodiment, the first byte of the address header 402 corresponds to the identifier of the device or controller to which the message is being transmitted. The second byte of the address header 402 corresponds to the 1 byte identifier assigned to the device or controller transmitting the message. The 4 byte encrypted message field includes, in encrypted form, the instructions, information, or data being transmitted. The 2 byte authenticator 404 represents a message authentication code (MAC) which is used to validate the message in accordance with the present invention.

Given the problems of line noise when data is communicated over power lines and the low power levels of radio frequency signals used for implementing wireless home control systems, corruption of transmitted messages can be a problem. The relatively short 8 byte overall length of the message 400 has been selected to increase the chance of a complete error free message being received. The short message length also decreases the amount of time required to repeat a message in the event that a message is not received as compared to the time that would be required if, e.g., 16 or 32 byte messages were used.

While 8 byte messages are used in the exemplary embodiment for the reasons discussed above, the methods and apparatus of the present invention are not limited in their applicability to such messages. In fact, the application of the present invention to systems which use messages of other lengths including, e.g., 4, 16 and 32 byte message lengths is contemplated.

Figure 5C:
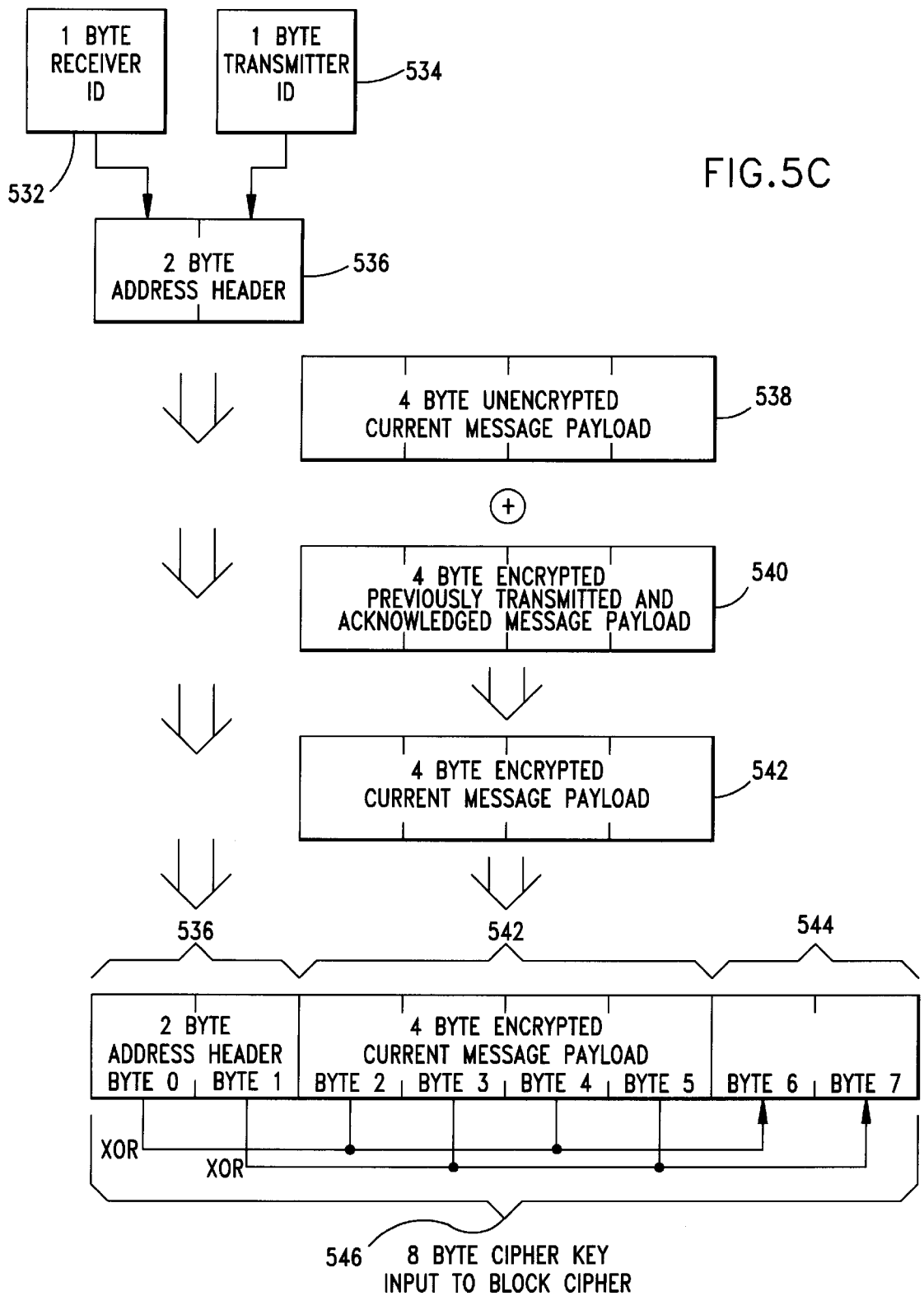
FIG. 5C illustrates the data processing which occurs when the steps illustrated in FIGS. 5A and 5B are performed.

The steps and data processing operations associated with generating an encrypted message 400 will now be described with references to FIGS. 5A, 5B and 5C. The encoded message generation process beings with the start step 502. In step 502, various microprocessor initialization operations are performed and all or portions of the cipher code 236 and authentication and message processing code 238, relating to the generation of encrypted messages, is loaded into the RAM 220.

Operation progresses from step 502 to step 504 wherein a message header 536 is generated. The generation of the message header 536 is illustrated in FIG. C. The message header 536 is generated by combining the identifier 532, assigned to the intended recipient of the message, and the identifier 534, assigned to the transmitter of the message, e.g., the controller 102.

After generation of the message header 536, a 4 byte encrypted current message payload 542 is generated. The encrypted current message payload 542 may be generated by combining the unencrypted current message payload 538 with a previous message payload, e.g., the encrypted previously transmitted and acknowledged message payload 540. For security reasons, it is desirable that the generation of the encrypted current message payload 542 involve as many of the properties of adding a positive number as reasonably possible. In particular, the concepts of "greater than" and "less than", while being subject to break down in a "stone-scissors-paper" like cycle on any finite sized computer data structure, should hold for as long as possible. This makes it easy to notice when an unauthorized person is trying to move things backwards rather than forward. Addition modulo-2**32 is one suitable implementation.

In one embodiment, the encrypted current message payload is generated from a 4 byte unencrypted current message payload 538, representing the instruction, information, or data to be transmitted, and the most recently transmitted and acknowledged encrypted message payload 540, that was sent to the same device to which the current message is being directed.

The encrypted previously transmitted and acknowledged message payload 540 can be obtained from the EPROM 222 which includes a memory segment 219 dedicated to storing such data. In the event that the message payload being encrypted is the first message payload to be sent to the particular receiving device, a default value is used for the value of the encrypted previously transmitted and acknowledged message payload 540.

Once the message header is generated operation progresses to step 506 wherein encrypted message payload 542 is generated. The encryption scheme used in step 506 is a relatively simple one to implement requiring very little in terms of memory or processing resources. It involves the addition of the 4 byte unencrypted current message payload 538 to the 4 byte encrypted previously transmitted and acknowledged message payload 540 to generate the 4 byte encrypted current message payload 542.

While more complicated encryption schemes could be used, the encryption scheme of the present invention offers a reasonable amount of security in applications such as home control systems where authentication is much more important than maintaining, as a secret, the content of individual messages. As can be readily appreciated, it is rarely important to maintain, as a secret, when an appliance such as a coffee maker or light is to be turned on or off. However, it is of greater importance that an unauthorized individual be unable to control, e.g., turn off, security lights or other systems at will. Denying unauthorized individuals control capability is achieved, as will be discussed below, using a relatively effective authentication technique of the present invention.

After the message address header 536 and 4 byte encrypted current message payload 542 is generated, they are combined in step 508, e.g., by concatenating the message payload 542 to the message address header 536 to generate bytes 0 through 5 an 8 byte cipher key 546. Next, in step 510, the cipher key's even bytes, e.g., bytes 0, 2, 4 are logically XORed to generate byte 6 of the cipher key 546. After generation of cipher key byte 6, byte seven is generated in a similar manner in step 512. This is done by XORing odd cipher key bytes 1, 3, and 5 together. The generation of the 8 byte cipher key 546, by performing steps 508, 510, 512, is illustrated in FIG. 5C.

Once the 8 byte cipher key 546 is generated, operation progresses to step 514 wherein the 8 byte cipher key is supplied to a block cipher 602 into which the 8 byte cipher code was previously loaded, e.g. stored. The block cipher 602 may be part of a software implemented authentication module 600. One such module 600 is illustrated in FIG. 6. In step 514, the block cipher 602 is operated to generate an 8 byte block cipher output as a function of the cipher key and stored cipher text.

In accordance with one embodiment of the present invention, the block cipher 602 is implemented using software 236 stored in the ROM 230 and the S-box 234 selected from the application code. The cipher code 236, implemented in accordance with the present invention, is designed to require relatively little space to store and to still provide a reasonable degree of security.

The high degree of security achieved by the present invention is achieved by taking advantage of the relatively large number of available processor instructions. Consider for example, that 6,400 instructions can be performed in the 6.4 msecs which required to transmit an 8 byte message, assuming a data rate of 10 KBPS, if a 1 MHz processor is used as the processor 228. In accordance with the present invention, the available processor operations are used to perform a series of 32 sequential data manipulation and substitution operations using what may be described as the plain text S-box 234, and the 8 byte cipher key.

Pseudo code for one embodiment of the block cipher of the present invention is set forth below:

---

Block cipher begin:
    for r = 1 to 32 do:
        for i = 1 to 8 do:
            1.  add byte (i) of cipher text to byte (i) of
                cipher key ignoring the carry to generate a 1
                byte S-box address
            2.  use the generated 1 byte S-box address to
                access the S-box and obtain therefrom 1 byte
                starting with the location specified by the
                S-box address
            3.  add the byte obtained by accessing the S-Box
                to the (i+1) cipher text byte which is the
                next cipher text byte, ignoring the carry, to
                generate a new i+1 text byte
            4.  rotate the contents of the new (i+1) cipher
                text byte by shifting the contents of the
                (i+1) cipher text byte to the left by one bit
                and replace the previous (i+1) cipher text
                byte with the resulting byte
            5.  i=i+1;
        end for;
        r = r+1;
    end for;
    output modified 8 bytes of cipher text as block cipher
    output;

Block cipher end.

Using an 8 byte cipher "key" and 8 bytes of plain "text" the block cipher can be implemented on an Intel 8051 microprocessor using the following 8051 assembly language program:

$title(small slow 51 encryptor)
$nomod51
$nopaging
$list
   name slow__51__encrypt
   sbox equ ????h
   text data 32
   key data 41
ofRounds equ 32
   size equ 8
   cseg
   org ????
   mov dptr,#sbox
Allrounds:
   mov r3,#ofRounds
Oneround:
   mov r0,#text
   mov r1,key ; 8-byte key, 8-byte text
   mov r2,#size; =8
   mov text+8,text ; to get wraparound logic
subround:
   mov a,@r0
   add a,@r1
   movc a,@a+dptr ; dptr is frozen, pointing to table in ROM,
   which is
                             ; just part of the code
   inc r0
   add a,@r0
   rl a ; make sure bits in table get "scrambled" some
   mov @r0,a
   inc r1
   djnz r2,subround
   mov text,text+8 ; finish wraparound logic
   djnz r3,Oneround
   end A C programming language version of the above block cipher code is as follows:
for(r=0;r<NumRounds;r++){
  text[8]=text[0];
  for(i=0;i<8;i++){
  text[i+1]=(text[i+1] +
  Sbox[(key[i]+text[i]%256])<<<1;//rotate 1 left
  }
  text[0]=text[8];
}

The full .HEX file resulting from the above 8051 assembly language program is:
:1004B000090?????7B20782079297A08852028E627DD
:0D04C00093082623F609DAF6852820DBE8EC
:00000001FF

---

Accordingly, the block cipher of the present invention can be implemented using very little ROM space. In addition, because it uses 32 rounds, i.e., each byte of the 8 byte cipher text gets modified 32 times and because the cipher operation utilizes 256 S-box look-up operations, a high degree of security can be achieved despite some short comings associated with failing to use a dedicated S-box. Various other features also add to the security of the present inventions block cipher scheme. For example, the rotate instruction which is part of the block cipher operation helps to compensate for the fact that all bit-planes in the S-box may not be equally random and/or non-linear by spreading the effect of the XORing operation among all of the bit planes of the S-box. In addition, the cipher key schedule is what may be characterized as stupid making parts of the encryptor commute with other components of the cipher operation. Furthermore, the modulo-2 additions used to implement the block cipher do not commute with the rotation of the cipher text. This has the advantage of avoiding attacks by decryption techniques known in the art as Biham and Benaroya's on Lucifer.

In addition to having the benefits of requiring very little memory to implement, and providing a high degree of security, it is worthwhile to note that the block cipher scheme of the present invention can be implemented using only 8 bit processing operations making it well suited for implementation on inexpensive 8 bit microprocessors and micro-controllers.

After the 8 byte output of the block cipher 602 is generated in the above described manner, operation progresses to step 516 wherein bytes 6 and 7 of the block cipher output are logically XORed with bytes 6 and 7 of the 8 byte cipher text to generate a two byte authenticator 610. The XORing operation is performed by device 604 in the FIG. 6 illustration.

From step 516 operation progresses to step 518 wherein the generated 2 byte authenticator 610 is combined, e.g., concatenated, with the previously combined 2 byte address header 536 and 4 byte encrypted current message payload 542 to produce the 8 byte message 700 illustrated in FIG. 7. Step 520 represents the transmission of the generated message 700.

Subsequent to transmission of a message, a transmitting device or controller will normally repeat the message at preselected intervals of time until a message acknowledgment is received in response to the transmitted message. Upon receiving such a message acknowledgment, the transmitting device or controller stores the encrypted message payload 542 which was just transmitted in section 219 of its EPROM, for use when encoding the next message directed to the same device as the acknowledged message.

Having described the message encryption and transmission process of the present invention, the message receiving, authentication and decryption process of the present invention will now be described with reference to FIGS. 8 through 11.

Figure 9A:
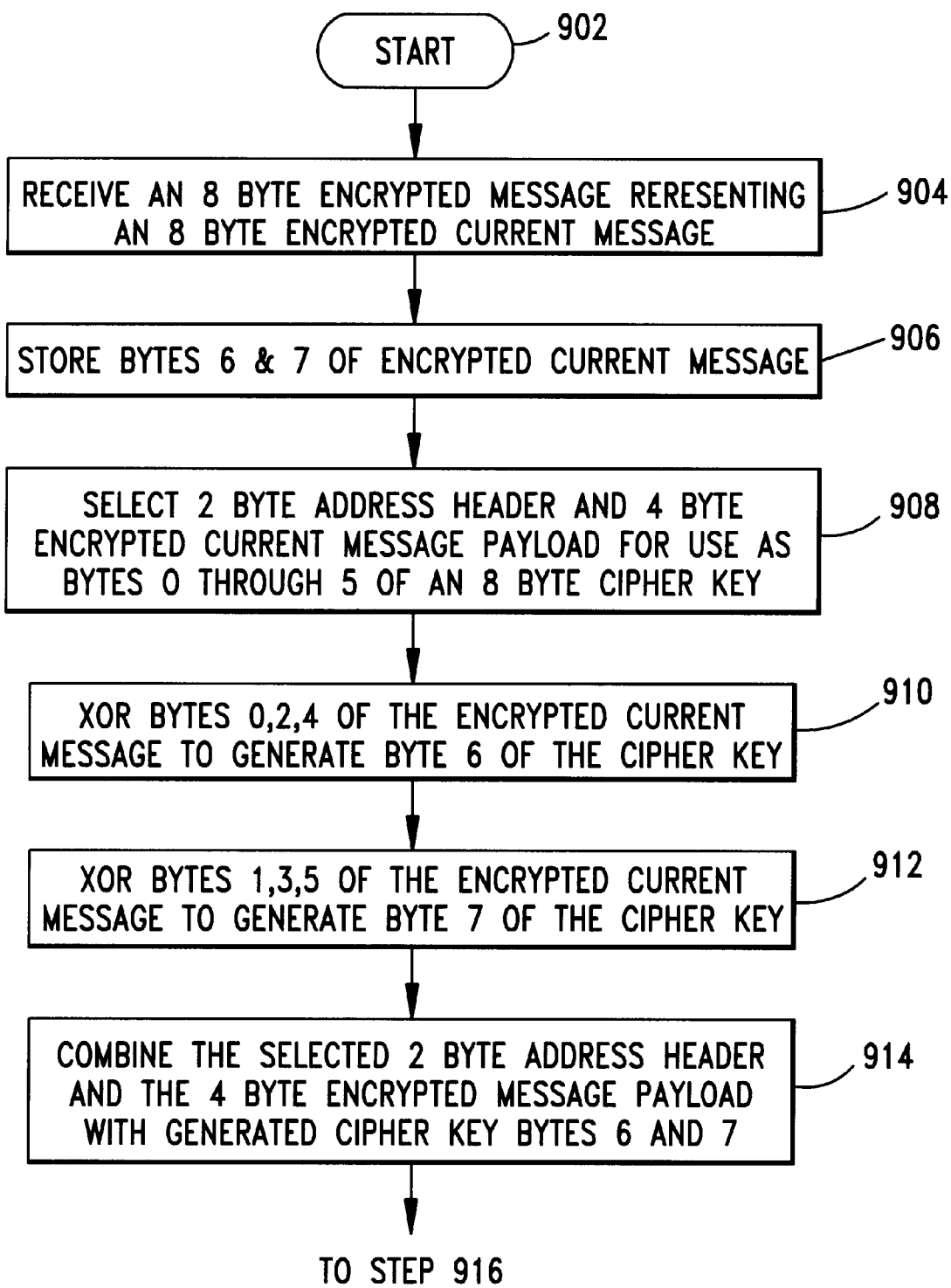
FIGS. 9A, 9B and 9C, in combination, illustrate the steps associated with receiving, authenticating and decrypting a message in accordance with the present invention.
Figure 9B:
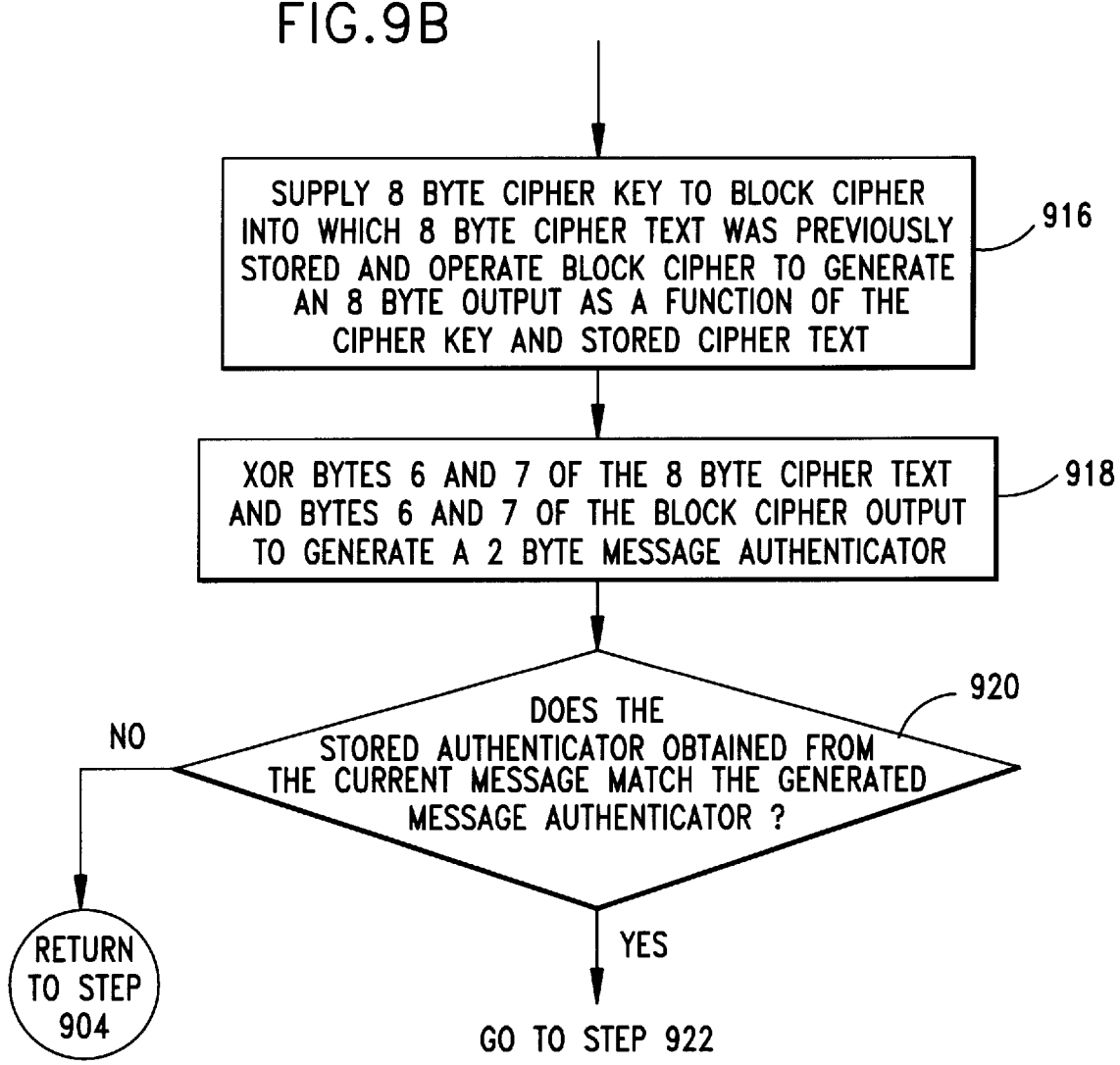
Figure 9C:
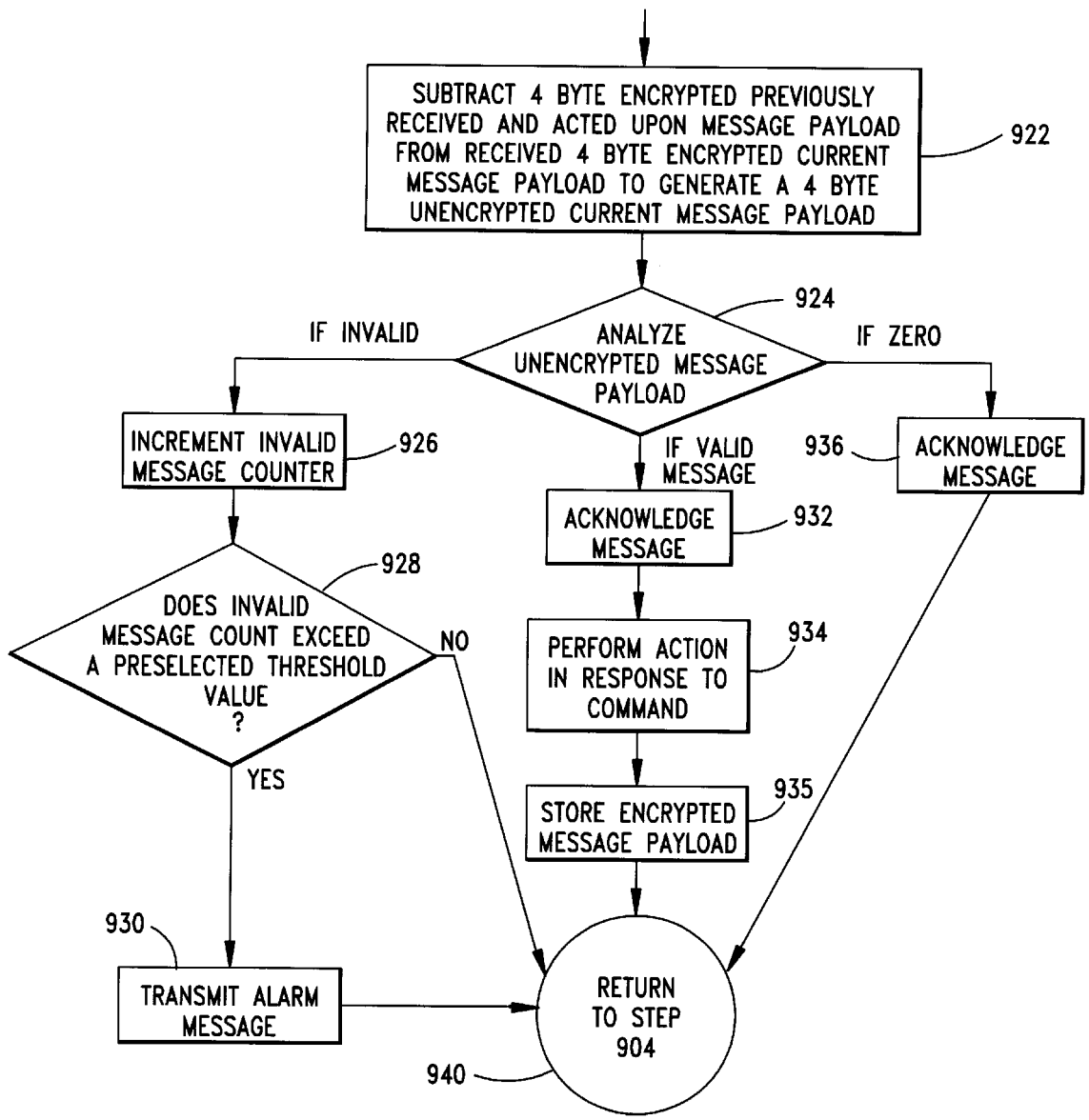

The message receiving and decryption process starts with system initialization operations which are performed in preparation for the receipt of messages as represented by the start step 902, illustrated in FIG. 9A. After the initialization operations are performed, e.g., the RAM 220 is loaded with message authentication and/or decryption routines, operation progresses to step 904 which involves the receipt of an 8 byte encrypted message. The message 700 illustrated in FIGS. 7 and 8 is representative of a received message. For purposes of explanation, the most recently received message will be referred to as the current message.

Once a full 8 byte message is received, in step 906, bytes 6 and 7 of the received encrypted current message, representing the transmitted message authenticator 610, are stored for future use in the message authentication process. Operation then progresses to step 908.

In step 908, the received 2 byte address header 536 and the 4 byte encrypted current message payload 542 are selected for use as bytes 0 through 5 of an 8 byte cipher key 800. Next, in step 910, byte 6 of the cipher key 800 is generated by XORing bytes 0, 2, and 4 of the encrypted together. Then, in step 912 cipher key byte 7 is generated by XORing cipher key bytes 1, 3, and 5 together. Thus, during the received message authentication process, cipher key bytes 6 and 7 802 are generated from the message address header and encrypted message payload in the same manner that cipher key bytes 6 and 7 544 were produced during the message generation process.

After cipher key bytes 6 and 7 are generated by performing the XORing operations described above, the 2 byte message address header 536, 4 byte encrypted current message payload 542 and generated encryption key bytes 6 and 7 are combined to form the 8 bit encryption key 800.

The various operations performed in steps 906 through 908 to generate the cipher key 800 are illustrated in FIG. 8.

Once the cipher key 800 has been generated, it is supplied in step 916 to the block cipher 602 which is implemented in the receiving device. As part of step 916, the block cipher 602 is operated to generate an 8 byte output as a function of the cipher key and stored cipher text. During the message authentication process, the receiving device's block cipher is operated in the same manner as the block cipher 602 of the message source, e.g., as previously described above in regard to message generation. Because the code selected for use as the S-box 234 is common to both the transmitting and receiving devices or controllers, the output of the block cipher 602 will be the same for both the transmitter and receiver assuming that the cipher key and cipher text used in both cases is identical.

Once the block cipher 602 generates its 8 byte output, operation progresses to step 918. In step 918 bytes 6 and 7 of the 8 byte cipher text are logically XORed with bytes 6 and 7 of the block cipher output to generate a 2 byte message authenticator 810.

Figure 10:
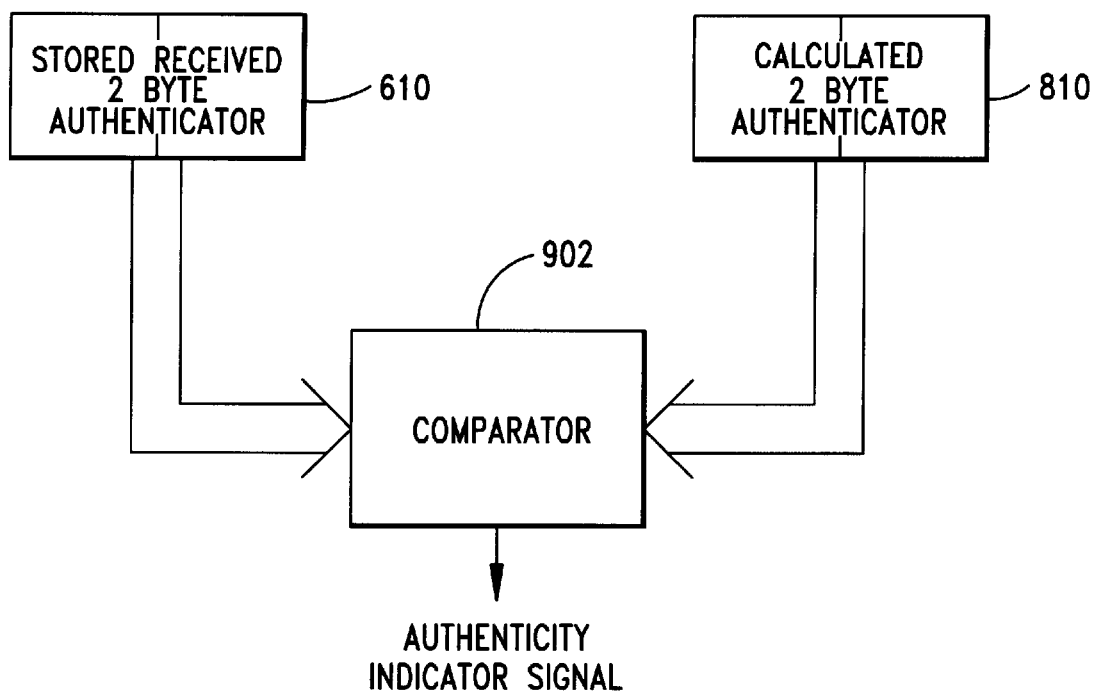
FIG. 10, illustrates the use of a comparator to perform step 920 of FIG. 9B.

From step 918 operation progresses to step 920 wherein the received and previously stored message authenticator 610 is compared to the generated message authenticator 810. FIG. 10 illustrates a comparator 902, that is suitable for performing the comparison operation of step 920 and for generating an authenticity indicator signal representing the result of the comparison operation. The comparator 902 can be implemented in software.

If the comparator 902 determines that the received and generated message authenticators 610, 810 do not match, the authenticity indicator signal will be set to 0 indicating that the received message is either erroneous or fraudulent. If a received message is determined to be erroneous or fraudulent in step 940, operation progresses to step 904 which returns operation to step 904 to await the receipt of a new message. In this way, time is not wasted by performing further operations, e.g., decryption operations, on an erroneous or fraudulent message.

However, if the comparator 902 determines that there is a match between the received and generated message authenticators 610, 810 then the authenticity indicator signal will be set to 1, indicating an authentic received message. Once the determination is made that a received message is authentic, operation progresses to step 922 where message decryption is performed.

In step 922, the last 4 byte encrypted message payload 950 received from the device transmitting the current message, that was acknowledged, is subtracted from the 4 byte encrypted current message payload 542. In this manner a 4 byte unencrypted current message payload 952 is generated. In the event that the message being decrypted is the first message to be received from the transmitting device, a default value is used as the 4 byte encrypted message payload to be subtracted.

Figure 11:
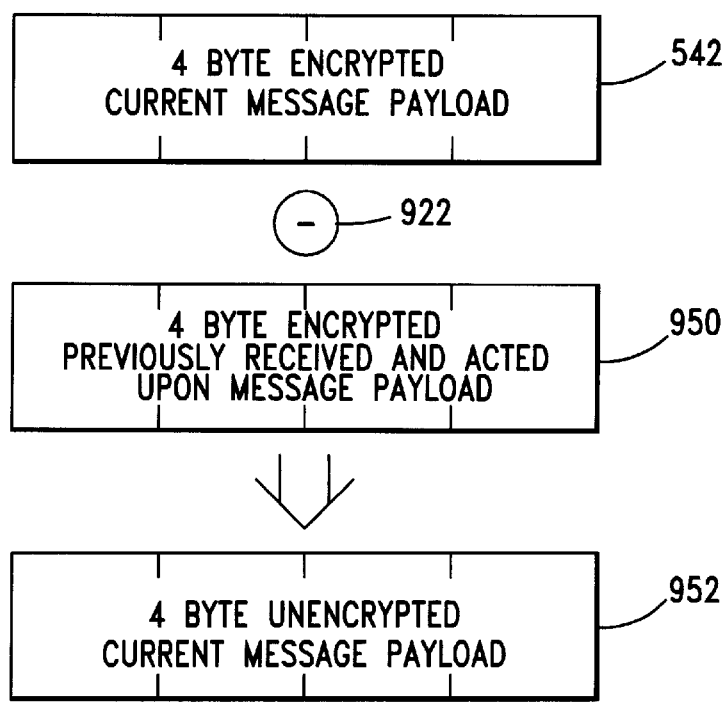
FIG. 11 illustrates a data processing operation associated with the decryption of a message in accordance with the present invention.

The operations performed in step 922 to generate the unencrypted current message payload 952 are illustrated in FIG. 11.

From step 922 operation progresses to step 924. In step 924 the unencrypted current message payload 952 is analyzed to determine what action should be taken in response to the contents of the message payload. This process involves looking at the value of the message payload to determine it is a repeat of the last received and acted upon message, and/or comparing the unencrypted message payload to a list of commands or instructions stored in memory to determine if a valid message has been received.

As a result of the message subtraction feature of the present invention, an unencrypted message payload value of zero results if the current message is a repeat of the last message. Repeated messages may be the result of the transmitting device or controller failing to receive an acknowledgment signal, e.g., due to noise problems. If the unencrypted message payload 952 is determined to have a value of zero in step 924, operation progresses to step 936 wherein a message acknowledgment signal is sent to the transmitting device. Operation then progresses to step 940, without any further action being taken in response to the message payload, wherein the system returns to step 904 to await receipt of the next message.

If, in step 924, e.g., through the use of an instruction or command look-up operation, it is determined that the unencrypted message payload represents a valid instruction or command, system operation progresses to step 932. In step 932 a message acknowledgment signal is transmitted to the source of the message. The instruction or command is then acted upon in step 934, e.g., the relay 212 of the device 200 is controlled by the micro-controller 202 in response to the received message to switch from one position to another. The encrypted message payload 542, of the message which was just acted upon, is then stored in step 935 for use in decoding future messages from the same source as the current message. The encrypted message payload 542 is stored in section 219 of EPROM 222 which has a dedicated memory space for each potential message source. Once the encrypted message payload is stored, operation progresses to step 940 and the system returns to step 904 to await receipt of another message.

If, it is determined in step 924, that an unencrypted message is invalid, e.g., because it does not correspond to a valid command or instruction, operation progresses from step 924 to step 926. In step 926 an invalid message counter implemented in, e.g., the EPROM 222, is incremented to reflect receipt of the current invalid message. In step 928 a check is made to determine if the counted number of invalid messages exceeds a preselected threshold value. If the preselected threshold is not exceeded, operation progresses to step 940 which returns system operation to step 904 to await the receipt of another message.

However, if, in step 928, it is determined that the number of counted erroneous messages exceeds a threshold value, operation progresses to step 930. Exceeding the preselected threshold value of erroneous messages is indicative of an attempt by an unauthorized individual to penetrate the home control system's security features. In order to warn of the potential threat to system security, in step 930 an alarm message is transmitted to the controller 102.

From step 930 operation progresses to step 940 which returns system operation to step 904 to await the receipt of another message.

In accordance with the present invention, the value of the counter maintained in step 928 may be reset at periodic intervals to take into consideration invalid messages resulting from, e.g., signal noise or interference.

While the present invention has been illustrated with reference to an exemplary embodiment, those skilled in the art will appreciate that various changes in form and detail may be made without departing from the intended scope of the present invention as defined in the appended claims. For example, a longer message length such as 16 or 32 byte messages may be used. Because of the variations that can be applied to the illustrated and described embodiment of the invention, the invention should be defined solely with reference to the appended claims.

What is claimed is:

1. A method of implementing a block cipher in a first device, comprising the steps of:
   selecting a block of application code used by the device in performing a first operation for use as a substitution box; and
   performing a cipher operation on a first set of bits, the cipher operation being different than the first operation and including the steps of:
   accessing a portion of the selected block of application code to obtain a set of substitution bits therefrom; and
   substituting the set of substitution bits for a portion of the first set of bits.

2. The method of claim 1, wherein the step of performing a cipher operation on the first set of bits further includes the step of:
   rotating the first set of bits.

3. The method of claim 2, wherein the step of performing a cipher operation on the first set of bits further includes the step of:
   repeatedly performing the accessing, substituting and rotating steps.

4. The method of claim 3, wherein the step of selecting a block of application code includes the step of:
   compressing a plurality of application code blocks and selecting the application code block which compresses the least for use as the substitution box.

5. The method of claim 3, wherein the step of selecting a block of application code includes the step of:
   selecting a block of code which is common to a plurality of devices which communicate with the first device.

6. A method of implementing a system including a plurality of devices, each device including a processor and memory, the memory of each device including application code for use in performing a first function, the method comprising the steps of:
   identifying application code that is included in each one of the plurality of devices;
   selecting a block of the identified application code to serve the function of being a substitution box, the substitution box function being different from the first function.

7. The method of claim 6, further comprising the step of programming each of the plurality of devices with code for implementing a block cipher operation.

8. The method of claim 7, wherein the step of programming each device to perform a block cipher operation includes the step of:
   programming each device to perform a plurality of substitution and shift operations as part of the block cipher operation.

9. The method of claim 8, further comprising the step of programming each of the plurality of devices to:
   receive a first encrypted message;
   store at least a portion of the first received encrypted message; and
   upon receiving a subsequent encrypted message subtract at least the stored portion of the first encrypted message from at least a portion of the subsequently received encrypted message to thereby determine if the subsequent encrypted message is a repeat of the first encrypted message.

10. The method of claim 8, further comprising the step of:

assigning each of the plurality of devices a unique identifier;

storing the unique identifier assigned to each device in the device to which the identifier is assigned; and storing within each particular one of the plurality of devices, the unique identifier assigned to the devices with which the particular device in which the unique identifiers are being stored is capable of communicating.

11. The method of claim 10, further comprising the step of;

programming each of the plurality of devices with an identical code to be used when performing a cipher operation.

12. The method of claim 10, further comprising the step of programming each of the plurality of devices to:

receive a first encrypted message;

store at least a portion of the first received encrypted message; and upon receiving a subsequent encrypted message subtract at least the stored portion of the first encrypted message from at least a portion of the subsequently received encrypted message to thereby determine if the subsequent encrypted message is a repeat of the first encrypted message.

13. The method of claim 12, wherein the each of the plurality of devices is programmed to implement only 8 bit operations.

14. A system, comprising:

a first device, the first device including:
a first processor;
first non-volatile memory coupled to the microprocessor;
first application code stored in the non-volatile memory; and
first means for implementing a block cipher using a segment of the first application code stored in the first non-volatile memory as a first substitution box.

15. The system of claim 14, further comprising:

a second device, the second device including:
a second processor;
second non-volatile memory coupled to the microprocessor;
second application code stored in the second non-volatile memory; and
second means for implementing a block cipher using a segment of the second application code stored in the second non-volatile memory as a second substitution box, and wherein the segments of the first and second application code used for the first and second substitution boxes have an identical content.

16. The system of claim 15, wherein each of the first and second devices further include:

means for storing received messages; and means for comparing a stored message to a received message to determine if the received message is a repeat of a stored message.

17. The system of claim 15, wherein the first device further includes:

a first authentication module for generating a message authenticator as a function of a message to be transmitted, the implemented block cipher, and a stored code common to both the first and second devices.

18. The system of claim 17, wherein the second device further includes:

a second authentication module for generating a message authenticator as a function of a received message, the implemented block cipher and the stored code common to both the first and second devices.

19. The system of claim 18, wherein the first authentication module includes means for logically XORing preselected portions of the message to be transmitted together to generate a portion of a first cipher key.

20. The system of claim 19, wherein the second authentication module includes means for logically XORing preselected portions of the received message together to generate a portion of a second cipher key.

21. The system of claim 19, wherein the means for implementing a block cipher included in each of the first and second devices includes means for rotating data and performing a plurality of substitution operations as a function of the content of the first and second substitution boxes, respectively.

22. The system of claim 19, wherein each of the first and second devices further include:

means for storing received messages; and means for comparing a stored message to a received message to determine if the received message is a repeat of a stored message.

23. The method of claim 15, wherein the means for implementing a block cipher included in each of the first and second devices includes means for rotating data and performing a plurality of substitution operations as a function of the content of the first and second substitution boxes, respectively.

24. The system of claim 15, wherein the first device is a controller which further includes an antenna for transmitting messages to the second device; and wherein the second device includes an antenna for receiving messages from the first device.

25. The system of claim 15, wherein the first device is a home appliance controller; and wherein the second device is a remotely controlled switched outlet.

26. A computer readable medium comprising:

computer executable instructions for performing the steps of:

selecting a block of application code used by the device in performing a first operation for use as a substitution box; and performing a cipher operation, the cipher operation being different from the first operation, on a first set of bits, the cipher operation including the steps of:

accessing a portion of the selected block of application code to obtain a set of substitution bits therefrom; and substituting the set of substitution bits for a portion of the first set of bits.

* * * * *